Aug. 10, 1965   J. H. CHILDS ETAL   3,199,343
ELECTRIC PROPULSION ENGINE TEST CHAMBER
Filed Oct. 12, 1961

INVENTORS
JAMES HOWARD CHILDS
WARREN D. RAYLE
JACK GROBMAN

BY

ATTORNEY 3,199,343
ELECTRIC PROPULSION ENGINE TEST
CHAMBER
James Howard Childs, Olmsted Falls, Warren D. Rayle,
Berea, and Jack Grobman, Lakewood, Ohio, assignors
to the United States of America as represented by the
Administrator of the National Aeronautics and Space
Administration
Filed Oct. 12, 1961, Ser. No. 144,803
5 Claims. (Cl. 73—116)
(Granted under Title 35, U.S. Code (1952), sec. 266)

The invention described herein may be manufactured and used by or for the Government of the United States of America for governmental purposes without the payment of any royalties thereon or therefor.

This invention relates generally to systems for testing extraterrestrial propulsion engines and, more particularly, to a facility for testing an engine utilizing hydrogen as a propellant.

Electric propulsion engines, such as ion and plasma rockets, have been shown theoretically to have great potential for extraterrestrial space flight. The performance of these engines must be investigated experimentally, however, in order to determine whether this theoretical potential can be realized with actual engines. Experiments may be conducted aboard Earth satellites or on high altitude rocket flights and could conceivably yield the necessary data, but the resulting cost would be prohibitive. Ground facilities, therefore, are necessary to duplicate the low pressure environment necessary for research and development tests on the aforementioned engines.

A typical vacuum facility for testing ion engines consists of a cylindrical casing on the order of 20 feet long, 5 feet in diameter, with plates sealing the ends thereof and provided with mechanical pumps and oil diffusion pumps. Initial evacuation of the casing is obtained with the mechanical roughing pump; further evacuation of the cylinder to operational testing pressures is obtained by the oil diffusion pumps. Heretofore, ion engines empolying a propellant such as cesium have been tested in these high vacuum facilities. Inasmuch as the ion engines under consideration exhausts a large volume of flow rate, a prohibitively large number of the aforementioned oil diffusion pumps would ordinarily be necessary for directly pumping the propellant exhaust. However, since most of the propellants, including cesium, are highly condensable, liquid nitrogen cooled radiators or condensers are installed in the vacuum facility to condense the cesium, thereby greatly reducing the number of oil diffusion pumps required for a given propellant flow rate. This technique of using cooled condensers is defined in the art as cryopumping.

In addition to the use of ion rockets for extraterrestrial space flight, consideraiton is also being given to the use of plasma jet rockets. A plasma jet rocket is being considered since a higher thrust per unit jet area is attainable than with the ion rocket. Basically, a plasma jet may be formed by simply heating a hydrogen jet by an electric arc or by passing a hydrogen jet through heated porous tungsten plates. Obviously, a desired facility pressure environment for a given plasma jet hydrogen flow rate or throughput may be obtained by using a large number of oil diffusion pumps, but this substantially increases the initial cost associated with the facility and adds to the maintenance and upkeep. It is possible to reduce the number of pumps by cryopumping the hydrogen; however, cryopumping of hydrogen would require condensers cooled below the temperature of liquid helium, that is, below 4° Kelvin. A facility having provision for refrigeration below 4° Kelvin, although feasible, would be prohibitively high in cost and would have considerable maintenance problems.

Accordingly, one object of the instant invention is to provide a flexible testing facility for handling both ion engines and plasma jet engines.

Another object of the instant invention is to provide a testing facility for an engine using a hydrogen propellant wherein the propellant is pumped cryogenically at temperatures above the boiling point of hydrogen.

Still another object of the invention is to provide a vacuum testing facility having high hydrogen flow rates therein.

A further object of the present invention is to reduce the number of oil diffusion pumps associated with a vacuum facility for testing engines which use hydrogen as a propellant.

A still further object of the instant invention is to provide for low vacuum conditions in a facility for testing plasma jet engines.

Still another further object of the invention is to provide an apparatus for reducing the maintenance of a vacuum chamber for testing thermal rockets which utilize hydrogen as the propellant.

According to the present invention, the foregoing and other objects are obtained by reacting an exhaust jet with another gas over a catalyst bed to form a condensable vapor. The resulting vapor is then condensed on surfaces cooled to a temperature below that temperature associated with the testing pressure environment necessary to effect freezing of the vapor.

A more complete appreciation of the invention and many of the attendant advantages thereof will be readily apparent as the same becomes better understood by reference to the following detailed description when considered in connection with the accompanying drawing wherein.

Figure 1:
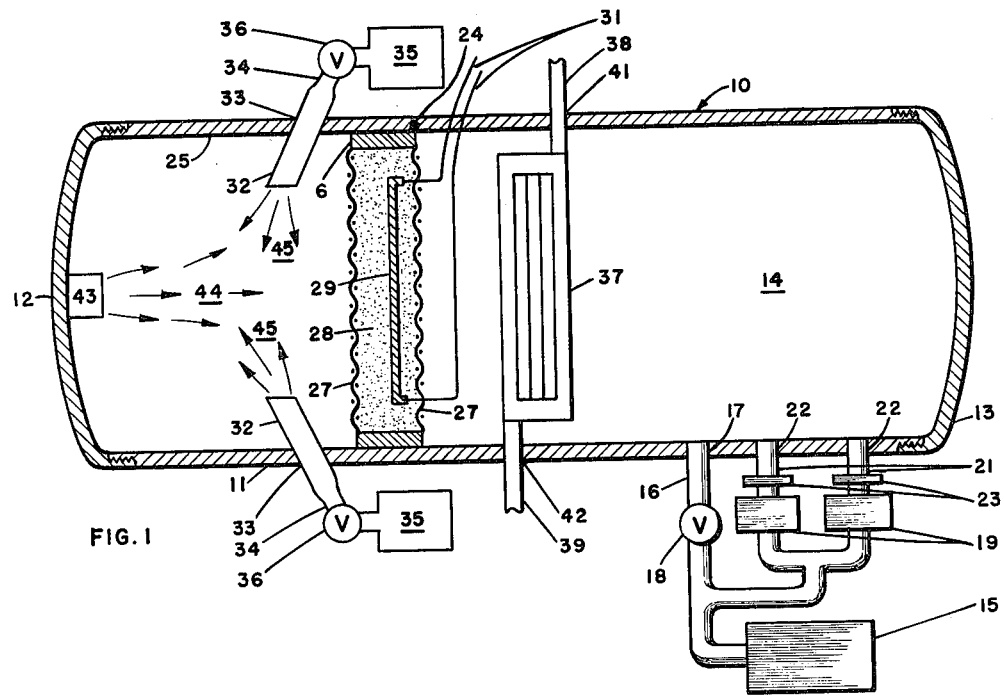
FIG. 1 is a plan view, partly in section, illustrating a test facility utilizing one embodiment of the present invention.

Referring now to the drawing wherein like reference numerals designate identical or corresponding parts, there is shown in FIG. 1 an electric thermal rocket testing facility 10. The facility 10 is composed of an elongated cylindrical shell 11 having hemispheroidal fore and aft ends 12 and 13, respectively, threaded on the ends of the shell 11, thereby defining a vacuum tight test chamber 14. It is to be recognized that all openings in the shell 11 hereafter discussed or otherwise needed will be appropriately sealed so as to provide for the vacuum tight chamber 14. A mechanical roughing pump 15 is connected to the chamber 14 through piping 16 terminating in an opening 17 formed in the shell 11. The mechanical pump 15 serves the purpose of quickly pumping down the chamber 14 to a pressure lower than atmospheric. Piping 16 is provided with a valve 18 to prevent entrance of atmospheric air into the chamber 14 after initial vacuum conditions therein are reached. For a further reduction of the test chamber pressure, a plurality of oil diffusion pumps 19 are connected to the test chamber 14 through conduits 21 terminating in openings 22 formed in shell 11. As is well known in the art, liquid nitrogen cooled baffles 23 are installed in conduits 21 to prevent backstreaming of the pump oil. Although only two pumps are shown, it is understood that the number of oil diffusion pumps 19 depends upon the exhaust flow removal necessary for the engines to be tested. Therefore, obviously the quantity of pumps 19 may be increased to a number larger than two.

A catalytic reaction device 24 is transversely disposed in the chamber 14 and secured to the inner surface 25 of the shell 11. The device 24 includes a band, or ring 26, of finite thickness having screens 27 fabricated of a Monel material affixed to the ends thereof. A catalyst bed 28 formed of a catalyst such as a commercial grade of palladium-coated alumina pellets, platinum, copper oxide, and/or a combination of these is disposed between the screens 27 and contained thereby. In practice, a catalyst bed consisting of ⅛-inch long by ⅛-inch diameter cylindrical pellets of an alumina carrier coated with palladium has performed satisfactorily. The aforementioned alumina carrier-palladium catalyst has a porosity of approximately 35 to 40 percent void. A heater 29 of the electric resistance wire type is positioned within the catalyst 28 and is connected in series with a rheostat (not shown) for temperature control purposes to an external source of energy (not shown) by conductors 31. A plurality of similar angularly-disposed, forwardly-directed nozzles 32 protrude into the chamber 14 through apertures 33 formed in the shell 11 between the catalyst bed arrangement 24 and shell fore end 12. Piping 34 provides communication between one or more sources of pressurized oxygen gas 35 and nozzles 32, each pipe having a valve 36 disposed therein for oxygen gas flow rate control.

A radiator or condenser 37, which is utilized as a condensing surface, is transversely disposed in the test chamber 14 between the catalytic reaction device 24 and shell aft end 13. The radiator 37 is contained in a spaced relation to the catalytic reaction device 24 by an inlet pipe 38 and outlet pipe 39 extending through openings 41 and 42, respectively, formed in the shell 11. The inlet pipe 38 and exit pipe 39 also serve as conduits to a pressurized source of coolant (not shown) and storage chamber (not shown), respectively. The coolant utilized must provide a radiator temperature less than that required to freeze water vapor at the chamber test pressure. For example, flow of liquid nitrogen through the radiator 37 provides a radiator temperature of about −320° F. and will effect freezing of water vapor down to a chamber test pressure of $10^{-10}$ millimeters of mercury.

In operation of the test facility 10, an electrical thermal engine 43, such as a plasma arc engine utilizing hydrogen gas, is securely affixed to the inner surface of the shell fore end 12 having the hydrogen gas exhaust 44 thereof directed inwardly of the chamber 14. Engine hydrogen gas and electrical power requirements for the engine under test may be supplied by any suitable system (not shown). Cryopumping of the hydrogen exhaust jet is accomplished by injecting gaseous oxygen 45 into the hydrogen jet 44 through the nozzles 32 so as to effect mixing with the hydrogen exhaust 44. The mixture of hydrogen and oxygen will chemically react catalytically in passing through the catalyst bed 28, thereby forming water vapor. The water vapor will then solidify or condense on the cooled radiator 37 as ice, thereby increasing hydrogen flow rate removal appreciably without increasing the number of oil diffusion pumps. The volume flow rate of oxygen required is regulated by valves 36 and is approximately that required for a stoichiometric ratio—that is one half the hydrogen flow rate—in order that the major portion of both gases may react to form the condensable product. It has been determined experimentally that the chamber pressure is relatively insensitive to equivalence ratio, minimum chamber test pressures being maintained for a given hydrogen gas flow with oxygen flow rates varying plus or minus 30 percent from stoichiometric.

Although the temperature of the catalyst bed 28 has no effect on hydrogen cryopumping flow rate and chamber test pressure, when a catalyst of alumina-coated palladium is utilized, the heater 29 is desired. It would be preferred, for example, that the catalyst bed 28 be operated at a temperature to prevent or reduce the percentage of water vapor absorbed by the catalyst bed. In addition, the heater 29 is capable of providing an inherent facility pre-operation and post-operation outgassing and for driving off water formed by the catalyst reaction during long run times in order to prevent a reduction in the effective area of the catalytic surface. The heater is essential when the catalyst bed is comprised of copper oxide. In order to transform the mixture of hydrogen and oxygen gas into water vapor, the copper oxide must be heated to about 1500° F.

Cryopumping will occur only as long as the effective surface area of the catalyst bed 28 is not reduced by water condensation thereon or poisoning thereof. Reduction in surface area by water condensation on the catalyst can be averted by applying heat to the bed by the heater 29. The effect of poisons, however, on the performance of the catalyst must be usually corrected by a reactivation process on the bed. Some of the poisons which must be avoided in a facility of this nature are chlorine and sulphur compounds, carbon monoxide, and unsaturated hydrocarbons.

Figure 2:
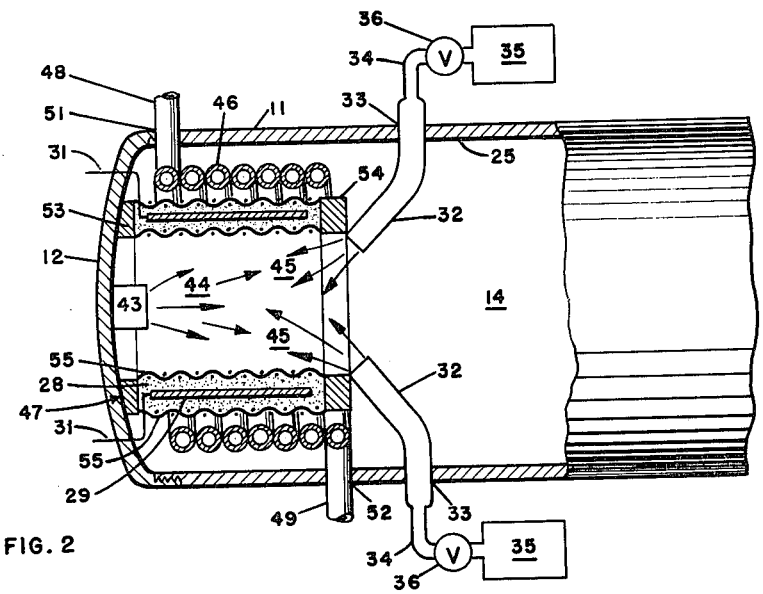
FIG. 2 is a plan view, in section, of an alternative arrangement of a catalyst bed and condensing radiator.

The catalyst bed arrangement described in reference to FIG. 1 will provide optimum hydrogen conversion to water vapor because the high blockage area of the catalytic reaction device 24 effects a more intimate contact between the mixed hydrogen oxygen-gases and catalyst bed 28. However, if the catalyst bed concept is utilized with a facility which is also used for testing ion rocket engines, interference will occur between the ion exhaust jet and catalyst bed. Therefore, for testing of both hydrogen plasma-jet and ion-jet engines in one facility, a rearranging of the catalyst bed and nitrogen-cooled radiator, as is shown in FIG. 2, may be utilized. As shown, a radiator 46 and catalytic reaction device 47 are disposed in the test chamber 14 near the fore end 12 thereof annularly parallel to the shell inner surface 25 and circumscribing the hydrogen exhaust 44. The radiator 46 is formed of a spiral or coil grouping of a continuous tube having an inlet pipe 48 and exit pipe 49 connected thereto through openings 51 and 52, respectively, formed in the shell 11. The catalytic reaction device 47 which is positioned between the engine 43 and radiator 46 has a front ring end 53 secured to the shell fore end 12 and the opposite ring end 54 secured to a plurality of diametrically-spaced oxygen gas injection nozzles 32. Annular screens 55 are secured to the inner and outer diameters of the ring ends containing thereby a catalyst bed 28. Oxygen gas 45 exiting from nozzles 32 into the hydrogen exhaust gas 44 mixes therewith. The resulting hydrogen-oxygen mixture passes through the catalyst bed 28, thereby undergoing a catalytic conversion to water vapor which, in turn, freezes on the coiled condensing device 46.

A geometric configuration, as shown in FIG. 2, can be easily incorporated with an ion engine testing facility without effecting interference with the ion engine exhaust jet. The instant invention may, therefore, be used in combination with an ion engine testing facility to provide for maintaining chamber pressure environment with the increased flow rate associated with a hydrogen plasma jet engine therein without increasing the number of oil diffusion pumps.

As can readily be seen, one significant advantage of this invention is that it enables cryogenic pumping of hydrogen using condensing temperatures above the boiling point of hydrogen by the catalytic conversion of hydrogen to water vapor. It is to be understood that the radiator and catalytic bed geometry may be modified for a specific facility and still be within the scope of the invention. For example, the facility shell may be double-walled with liquid nitrogen flow therebetween, thereby enabling the entire shell surface to act as a cooling radiator.

Obviously, many modifications and variations of the present invention are possible in the light of the above teachings. It is, therefore, to be understood that within the scope of the appended claims the invention may be practiced other than as specifically described.

What is claimed is:

1. A testing facility for an engine which discharges an exhaust of hydrogen gas comprising
    a vacuum tight shell, thereby forming a vacuum chamber within which the engine is positioned,
    means in communication with said chamber for obtaining a desired subatmospheric test pressure in said chamber,
    means for selectively injecting gaseous oxygen into the path of the hydrogen exhaust jet to provide a hydrogen-oxygen mixture having an equivalence ratio of not more than plus or minus 30 percent from a stoichiometric ratio,
    an annular catalyst bed disposed within said chamber circumscribing the hydrogen exhaust for converting the hydrogen-oxygen mixture into water vapor, said catalyst bed including palladium-coated alumina pellets,
    annular condensing means disposed within said chamber between said catalyst bed and said shell, said condensing means being cooled to a temperature between the freezing point of the water vapor and the condensation point of hydrogen gas at the test pressure to effect transformation of the water vapor to ice.

2. A testing facility for electric propulsion engines including the type which discharges an exhaust jet of hydrogen gas comprising
    a vacuum tight shell, forming thereby a vacuum chamber within which the engine is disposed,
    means in communication with said chamber for obtaining a desired subatmospheric test pressure in said chamber,
    means disposed in said chamber for directing gaseous oxygen into the hydrogen exhaust gas, thereby effecting a gaseous hydrogen-oxygen mixture,
    an annular catalyst bed disposed within said chamber circumscribing the hydrogen exhaust jet for converting the hydrogen-oxygen mixture into water vapor, said catalyst bed including copper oxide and a heating element for heating said copper oxide to a temperature of approximately 1400° F., and
    annular condensing means disposed within said chamber between said catalyst bed and said shell, said condensing means being cooled below the freezing point of the water vapor and hydrogen gas at the test pressure to effect transformation of the water vapor to ice.

3. A testing facility for an engine which discharges a gaseous hydrogen exhaust jet comprising
    a vacuum tight shell, thereby forming a vacuum test chamber within which the engine is mounted,
    means in communication with said chamber for obtaining a desired subatmospheric test pressure in said chamber,
    means for selectively injecting gaseous oxygen into the path of the hydrogen exhaust at a rate to provide a hydrogen-oxygen mixture having an equivalence ratio of not more than plus or minus 30 percent from a stoichiometric ratio,
    a catalyst bed transversely disposed within said chamber for converting the hydrogen-oxygen mixture into water vapor, said catalyst bed being comprised of palladium-coated alumina pellets, and
    condensing means transversely disposed within said chamber, said condensing means being cooled to a temperature between freezing point of the water vapor and the condensation point of hydrogen gas at the test pressure to effect transformation of the water vapor to ice.

4. A testing facility for an egine which discharges a gaseous hydrogen exhaust jet comprising,
    an elongated cylindrical shell having fore and aft ends to thereby form a vacuum chamber within which the engine is positioned,
    vacuum pumping means for obtaining a lowered pressure in the chamber, disposed adjacent to said chamber and communicating with the chamber through piping means,
    a plurality of injection nozzles for selectively injecting gaseous oxygen into the path of the hydrogen exhaust jet to provide an equivalence ratio of not more than plus or minus 30 percent from a stoichiometric ratio, said nozzles protruding into the chamber and angularly directed towards the fore end of said chamber,
    a catalyst bed disposed transversely of said nozzles within said chamber for converting the hydrogen-oxygen mixture into water, and including a shell attaching band, a catalyst material of paladium-coated aluminum pellets disposed within said band, a heater element buried in said catalyst material, and a pair of screens of circular shape attached to said band to retainingly hold said catalyst material and
    a condensing means disposed transversely of said catalyst bed within said chamber, said condensing means being cooled below the freezing point of the water vapor and yet above the condensation point of hydrogen gas at test pressure to thereby effect the formation of ice, said condensing means including inlet and outlet portions passing through openings in said shell, said inlet and outlet portions spatially locating said condensing means within said shell.

5. A testing facility for an engine which discharges an exhaust of hydrogen gas comprising
    an elongated cylindrical shell having fore and aft ends thereby forming a vacuum chamber within which the engine is positioned,
    vacuum pumping means for obtaining a lowered pressure in the chamber, disposed adjacent to said chamber and communicating with the chamber through piping means,
    a plurality of nozzles protruding into the chamber and angularly directed towards the fore end of the chamber for selectively injecting gaseous oxygen into the path of the hydrogen exhaust jet to provide an equivalence ratio of not more than plus or minus 30 percent from a stoichiometric ratio,
    an annular catalyst bed disposed within said chamber circumscribing the hydrogen exhaust for converting the hydrogen-oxygen mixture into water, and including front and rear end rings with the front ring connected to the fore end of said cylindrical shell and the rear ring secured to said plurality of oxygen injecting nozzles, annular screens secured to the inner and outer diameters of said end rings and a catalyst material of palladium-coated alumina pellets disposed therebetween, and a heater element annularly disposed in said catalyst material, and
    an annular condensing means disposed within said chamber between said catalyst bed and said shell comprising a continuous spiral tubing having inlet and exit portions passing through openings in said shell, said condensing means being cooled below the freezing point of the water vapor and yet above the condensation point of hydrogen gas at the test pressure to thereby effect the formation of ice.

References Cited by the Examiner

UNITED STATES PATENTS

| | | | |
|---|---|---|---|
| 2,118,567 | 5/38 | Milas et al. | 23—288.8 |
| 2,826,480 | 3/58 | Webster | 23—2 |
| 2,863,729 | 12/58 | McDuffie et al. | 23—204 |
| 2,939,316 | 6/60 | Beecher et al. | 73—116 |
| 3,044,301 | 7/62 | Bennett | 73—116 |
| 3,063,291 | 11/62 | Childs et al. | 73—116 |
| 3,155,310 | 11/64 | Lorenz | 230—69 |

RICHARD C. QUEISSER, *Primary Examiner.*

DAVID SCHONBERG, *Examiner.*